Nov. 6, 1928.
D. F. FESLER
1,690,221
LUBRICANT COMPRESSOR
Original Filed April 27, 1923
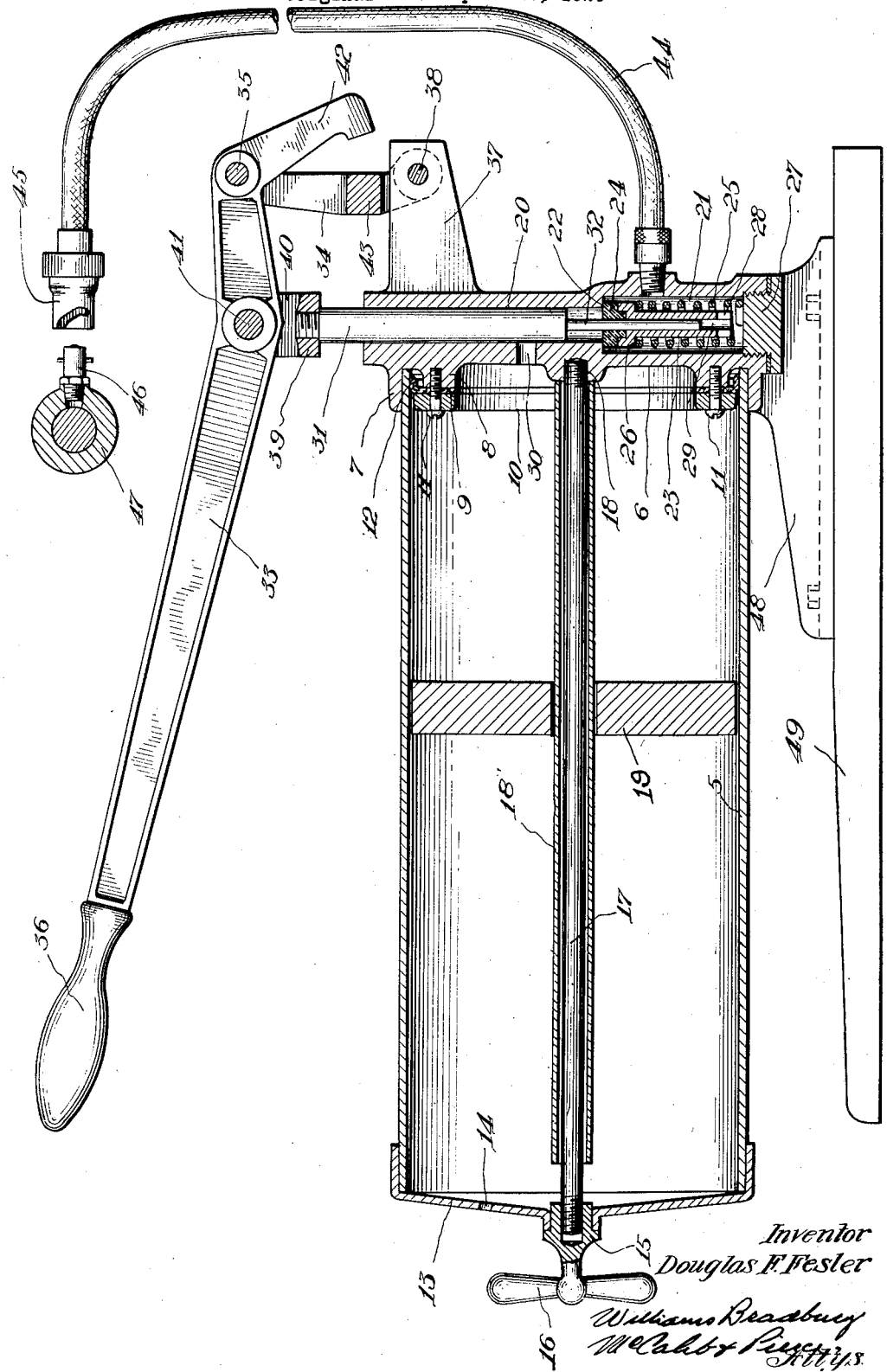
Inventor
Douglas F. Fesler Patented Nov. 6, 1928.

1,690,221

UNITED STATES PATENT OFFICE.

DOUGLAS F. FESLER, OF CHICAGO, ILLINOIS, ASSIGNOR TO THE BASSICK MANUFACTURING COMPANY, OF CHICAGO, ILLINOIS, A CORPORATION OF DELAWARE.

LUBRICANT COMPRESSOR.

Application filed April 27, 1923, Serial No. 634,936. Renewed October 21, 1926.

My invention relates to improvements in lubricant compressors and is particularly concerned with the provision of a lubricant compressor adapted to form part of a system for supplying lubricant under high pressure to bearings, this system comprising in general a plurality of fittings or nipples adapted to be secured to the bearings to be lubricated and a high pressure compressor adapted to be successively connected with said fittings or nipples and comprising means for forcing lubricant under high pressure into these fittings.

The objects of my invention are:

First. To provide a compressor of the character described having a large holding capacity, but capable of supplying lubricant under high pressure to the bearings at a comparatively rapid rate;

Second. To provide a compressor of the character described having a discharge conduit provided at its free end with means for making a sealed connection with a fitting and providing means whereby the pressure on the lubricant in the discharge conduit and the connecting means can be reduced so that when the connecting means is disconnected from the fitting, the lubricant will not be discharged therefrom;

Third. To provide a compressor of the character described embodying a low pressure cylinder which can be easily and quickly filled after the contents have been removed therefrom;

Fourth. To provide a compressor such as described in which the low pressure cylinder is provided with a follower preferably actuated by atmospheric pressure, the low pressure cylinder being detachable from and reversible relatively to the high pressure cylinder so as to expedite the filling of the low pressure cylinder; and Fifth. To provide a compressor of the character described which is simple in construction, economical to manufacture and easy to operate.

Other objects of my invention will appear as this description progresses, reference being had to the accompanying drawing in which I have illustrated one embodiment of my invention which is shown in vertical central section, the drawing including a transverse section of a bearing provided with a fitting for receiving lubricant from my improved compressor.

The embodiment of my invention illustrated in the accompanying drawing comprises a low pressure cylinder 5, one end of which is provided with the closure 6 which is substantially circular in form and has the two concentric annular ribs 7 and 8 projecting from one side thereof. A cup leather or gasket 9 is clamped to the outer face of the rib 8 by means of the clamping ring 10 and the screws 11. This gasket is provided with a flange 12 which is adapted to form a sealed joint with either end of the low pressure cylinder 5, which can be reversed, as will later be described, to bring either end into sealed relation with the gasket 9. I provide a cap 13 for closing the opposite end of the low pressure cylinder 5, this cap having a sliding fit with the cylinder and being provided with the vent opening 14 to permit atmospheric pressure to be exerted upon the contents of the low pressure cylinder. The cap 13 is provided with a central opening for receiving the nut 15, this nut being rotatably mounted in the opening and being provided with a handle 16 by means of which it can be rotated. The nut 15 is permanently secured to the outer end of the clamping rod 17, the inner end of which is provided with threads for making a connection with the internally threaded boss 18 which projects from the inner face of the closure 6 in concentric relation to the annular ribs 7 and 8. Surrounding the clamping rod 17 is a guide tube 18' upon which is slidably mounted the follower 19 which is disc shaped and preferably formed of wood. The diameter of this follower is preferably such that there is a slight space between the wall of the low pressure cylinder and the periphery of the follower.

The closure 8 is provided with a transversely extending bore 20, the inner end of which is enlarged to form a valve chamber 21 and the valve seat 22. Located within the valve chamber 21 is a third cylinder 23, to one end of which is secured the fibre valve 24, which is adapted to seat against the valve seat 22. A compression spring 25 surrounds the third cylinder 23. One end of this spring abuts against the shoulder 26 formed on the third cylinder and the other end of which abuts against a screw-threaded plug 27, closing the outer end of the valve chamber 21. Slots 28 are formed in the outer end of the third cylinder 23, so that when this cylinder is in its outermost position, its bore 29 will still be in communication with the valve chamber.

The smaller portion of the bore 20 forms a high pressure cylinder which communicates with the low pressure cylinder 5 through the opening 30. A plunger 31 is reciprocably mounted in the high pressure cylinder and is provided with the cylindrical extension 32 which extends through a suitable bore in the valve 24 and into the bore of the cylinder 23.

For reciprocating the plunger 31 I provide the lever 33, one end of which is connected with the upper end of a bifurcated link 34 by means of a pivot pin 35, and the other end of which is provided with a suitable handle 36. The link 34 has its lower end connected with a bracket 37 projecting from the closure 6 by means of a pivot pin 38. The outer end of the plunger 31 has a cap 39 secured thereto which is provided with outwardly extending bifurcations 40, only one of which is shown. These bifurcations are connected with an intermediate portion of the lever 33 by means of the pivot pin 41. For limiting the upward movement of the handle 36 relatively to the cylinder 5, I provide the lever 33 with a projection 42 adapted to strike the cross bar 43 of the link 34 when the handle 36 has been lifted a predetermined distance. In this manner the handle 36 may be used for carrying the compressor about.

The valve chamber 21 is provided with a flexible discharge conduit 44, the free end of which is provided with a coupling member 45 of well-known construction, by means of which a sealed connection may be established with the fitting or nipple 46 secured to a bearing 47.

In the operation of my improved compressor the coupling member 45 is attached to the fitting 46 and the operator then presses downwardly upon the handle 36. Thereupon the lubricant in the high pressure cylinder will be forced past the check valve 24 into the valve chamber and out through the discharge conduit 44 into the nipple 46. The length of the plunger is such that when the handle 36 is in its lowermost position, the valve 32 is contacted by and opened by the inner end of the plunger 31, so that when the operator lifts upwardly on the handle 36 the valve 24 will remain in contact with the end of the plunger 31 until the valve is seated. Continued upward movement of the plunger 31 produces a complete vacuum in the high pressure chamber so that when the end of the plunger begins to clear the opening 30, atmospheric pressure exerted on the outer face of the follower 19 will cause the follower 19 to move inwardly and force lubricant from the low pressure cylinder 5 into the high pressure cylinder until the latter is substantially completely filled. The compressor is then in condition to supply lubricant to another bearing.

The inward movement of the plunger 31 is accompanied by a corresponding movement of the cylinder 23, and after the valve 24 opens so as to equalize the pressure of the lubricant on both sides of this valve, this valve makes contact with the end of the plunger 31 as soon as it projects past the valve seat 22. In this position of the plunger 31 and the cylinder 23, the extension 32 of the plunger 31 substantially fills the bore of the cylinder 23. Thereafter, when the operator reverses the movement of the handle 36, the valve 24 and the cylinder 23 follow the movement of the plunger 31 until the valve 24 seats. Continued outward movement of the plunger 31 causes the extension 32 to be partially withdrawn from the cylinder 23, thereby creating a vacuum which tends to suck backwardly the lubricant in the discharge conduit 44 and the coupling 45, so as to prevent any of the lubricant being discharged from the coupling 45. With this construction it is unnecessary to provide a valve in the coupling 45 for automatically preventing the escape of lubricant therefrom when it is detached from the fitting.

When continued operation of my compressor has caused the follower 19 to move inwardly until it is positioned against the heads of the screws 11, or otherwise prevented from moving inwardly any further, the operator, by turning the handle 16, can disconnect the clamping rod 17 from the boss 18 so that the cover 13 can be removed from the outer end of the cylinder 5. The operator can then either fill the low pressure cylinder 5 while it is still positioned upon the closure 6 or he can remove the low pressure cylinder and fill it. In either event, after it has been filled it is reversed end for end so as to bring the follower 19 at the outer end of the cylinder. What was previously the outer end of the cylinder is inserted between the flange 12 of the gasket and the annular rib 7. The rod 17 can then be inserted through the guide tube 18', which is held in position by the lubricant surrounding it. This guide tube, therefore, serves to guide the rod 17 into the threaded opening in the boss 18. It also serves as a guide for the follower 19. In the drawing the space between the rod 17 and the guide tube 18 has been slightly exaggerated.

Upon rotating the handle 16 in the proper direction, the cap 13 can again be clamped to the outer end of the cylinder 5 and the latter is clamped to the closure 6.

I provide a pair of feet 48 which are integrally formed with opposite sides of the closure 6 and may be bolted or otherwise secured to a suitable platform 49 for supporting my compressor.

While I have described the details of construction of the preferred embodiment of my invention, it is to be clearly understood that my invention is not limited to these details of construction, but is capable of other adaptations and modifications within the scope of the appended claims.

Having thus described my invention, what I claim is:

1. A lubricant compressor comprising a horizontally disposed low pressure cylinder having a closure for one end provided with a bore, a closure for the other end, means for clamping said closures to the ends of said low pressure cylinder comprising a rod extending between said closures, a guide tube surrounding said rod, a follower slidably mounted upon said guide tube, one end of said bore being enlarged to form a valve chamber and to form a valve seat at the discharge end of the smaller portion of said bore, a cylinder reciprocably mounted in said valve chamber and carrying a valve for coacting with said seat, said valve and reciprocable cylinder having registering bores, a spring surrounding said reciprocable cylinder for yieldingly holding said valve on said seat, a plunger in the smaller portion of said bore, said plunger having a reduced extension projecting through said valve and into said reciprocable cylinder, and means for reciprocating said plunger.

2. A lubricant compressor comprising a horizontally disposed low pressure cylinder having a closure for one end provided with a bore, a follower slidably mounted in said low pressure cylinder, one end of said bore being enlarged to form a valve chamber and to form a valve seat at the discharge end of the smaller portion of said bore, a cylinder reciprocably mounted in said valve chamber and carrying a valve for coacting with said seat, said valve and reciprocable cylinder having registering bores, a spring surrounding said reciprocable cylinder for yieldingly holding said valve on said seat, a plunger in the smaller portion of said first named bore, said plunger having a reduced extension projecting through said valve and into said reciprocable cylinder, and means for reciprocating said plunger.

3. A lubricant compressor comprising a low pressure cylinder having a closure for one end provided with a bore, one end of said bore forming a valve chamber, a valve seat between said chamber and the remaining portion of said bore, a cylinder reciprocably mounted in said valve chamber and carrying a valve for coacting with said seat, said valve and reciprocable cylinder having registering bores, a plunger in the smaller portion of said first named bore, said plunger having a reduced extension projecting through said valve and into said reciprocable cylinder, and means for reciprocating said plunger.

4. A lubricant compressor comprising a low pressure cylinder, a closure for one end of said cylinder, said closure having a bore extending therethrough, one end of said bore being enlarged to provide a valve chamber and to form a valve seat at the end of the smaller portion of said bore, means for establishing communication between the smaller portion of said bore and said low pressure cylinder, a cylinder reciprocably mounted in said valve chamber, a plunger slidably mounted in the smaller portion of said bore and having an extension slidable in said reciprocable cylinder, and a valve for closing the discharge end of the smaller portion of said bore.

5. A lubricant compressor comprising a low pressure cylinder, a high pressure cylinder communicating therewith, a valve chamber communicating with the discharge end of said high pressure cylinder, a valve in said valve chamber for closing the discharge end of said high pressure cylinder, a third cylinder communicating with said valve chamber, and a plunger slidable in said high pressure cylinder and provided with an extension slidable in said third cylinder.

6. A lubricant compressor comprising a low pressure cylinder, a high pressure cylinder communicating therewith, a valve chamber communicating with the discharge end of said high pressure cylinder, a third cylinder communicating with said valve chamber, means for placing the lubricant in said high pressure cylinder under pressure, means coacting with said third cylinder for reducing the pressure on the lubricant in said valve chamber, and common means for actuating said two last named means.

7. A lubricant compressor comprising a low pressure cylinder, a high pressure cylinder communicating therewith, a valve chamber for receiving lubricant from said high pressure cylinder, a valve for preventing a return flow of lubricant to said high pressure cylinder, and means in said valve chamber for reducing the pressure on the lubricant in said chamber.

8. A lubricant compressor comprising a body having a bore, a plunger reciprocable in said bore, a valve overlying the end of said bore, said plunger being movable into contact with said valve to completely displace the contents of said bore, a valve chamber and a discharge conduit receiving the material passing said valve, and means operated in synchronism with said plunger for automatically decreasing the capacity of said chamber and conduit during the discharge stroke and increasing said capacity during return stroke, said means comprising an extension on said plunger and a central cylinder carried by said valve and slidably receiving said extension, said cylinder opening into said chamber below the level of said valve and below said discharge conduit.

9. A lubricant compressor comprising a body having a bore, a plunger reciprocable in said bore, a valve overlying the end of said bore, said plunger being movable into contact with said valve to completely displace the contents of said bore, a valve chamber and a discharge conduit receiving the material passing said valve, and means operated automatically in synchronism with said plunger for decreasing the capacity of said chamber and conduit during the discharge stroke and increasing said capacity during return stroke.

10. A lubricant compressor comprising a body having a bore, a plunger reciprocable in said bore, a valve overlying the end of said bore, said plunger being movable into contact with said valve to completely displace the contents of said bore, a valve chamber and a discharge conduit receiving the material passing said valve, and means operated in synchronism with said plunger for automatically decreasing the capacity of said chamber and conduit during the discharge stroke and increasing said capacity during return stroke, said means comprising an extension on said plunger and a central cylinder carried by said valve and slidably receiving said extension.

11. A lubricant compressor comprising a body having a bore, a check valve at one end of said bore, a plunger in said bore movable into contact with said valve to completely expel the contents of said bore, a receiving system communicating with the discharge side of said valve, said receiving system having a second continuously open bore communicating with said system, a second plunger slidable in said second bore, and common means for moving both plungers in and out in synchronism, said second plunger being mounted on the end of said first plunger and extending through said valve.

12. A lubricant compressor comprising a body having a bore, a check valve at one end of said bore, a plunger in said bore movable into contact with said valve to completely expel the contents of said bore, a receiving system communicating with the discharge side of said valve, said receiving system having a second continuously open bore communicating with said system, a second plunger slidable in said second bore, and common means for moving both plungers in and out in synchronism.

13. A lubricant compressor comprising compressing means, a check valve receiving and passing the material delivered by said compressing means, and preventing return flow, a discharge conduit for delivering the material passed by said check valve, means for relieving the pressure in said discharge conduit without loss of material from said conduit, and an automatic operating connection between said compressing means and said relieving means.

14. A compressor comprising pump means, a cylindrical reservoir for said pump, said reservoir being connected at one end to said pump and being reversible end for end, a cap for the end of said reservoir remote from said pump, a tension rod extending axially from said cap to said pump for fastening said cap and cylinder in place, a sleeve housing said tension rod, and a suction follower slidable on said sleeve.

In witness whereof, I hereunto subscribe my name this 23rd day of April, 1923.

DOUGLAS F. FESLER.